United States Patent [19]

Ami et al.

[11] Patent Number: 5,535,362
[45] Date of Patent: Jul. 9, 1996

[54] DATA TRANSFER CONTROL APPARATUS WHEREIN A TIME VALUE IS COMPARED TO A CLOCKED TIMER VALUE WITH A COMPARISON OF THE VALUES CAUSING THE TRANSFER OF BUS USE RIGHT

[75] Inventors: Yasuhiro Ami; Takeshi Fujii, both of Hyogo-ken, Japan

[73] Assignee: Mitsubishi Denki Kabushiki Kaisha, Tokyo, Japan

[21] Appl. No.: 13,450

[22] Filed: Feb. 4, 1993

[30] Foreign Application Priority Data

Mar. 6, 1992 [JP] Japan ..................... 4-084517

[51] Int. Cl.⁶ .................................. G06F 13/00
[52] U.S. Cl. ................ 395/474; 395/494; 395/550; 395/842; 395/848; 364/242.31; 364/242.34; 364/DIG. 1; 364/242.8; 364/242.92
[58] Field of Search ................... 364/242, 242.31, 364/242.34, 242.8, 242.92; 395/275, 474, 494, 550, 842, 848

[56] References Cited

U.S. PATENT DOCUMENTS

| | | | |
|---|---|---|---|
| 4,831,523 | 5/1989 | Lewis et al. | 395/275 |
| 5,077,664 | 12/1991 | Taniai et al. | 395/425 |
| 5,089,955 | 2/1992 | Morinaga et al. | 395/800 |
| 5,297,292 | 3/1994 | Morimoto et al. | 395/725 |

OTHER PUBLICATIONS

Intel iAPX 86/88, 186/188 User's Manual, Hardware Reference, 1985, pp. 1–112–1–115 and FIGS. 1–95, 1–96.
Patent Abstracts of Japan, P–1093, Aug. 16, 1990 vol. 14, No. 381 (JP 2–143360, Jun. 1, 1990).
Mitsubishi Electric User's Manual M37720S 2.13 DMAC.

Primary Examiner—Tod R. Swann
Assistant Examiner—Frank J. Asta
Attorney, Agent, or Firm—Townsend and Townsend and Crew

[57] ABSTRACT

To change the priority order of a DMA transfer circuit and a CPU for the bus use right in a data processing system comprising the DMA transfer circuit, when an overflow occurs in the DMA transfer timer during DMA transfer, a request signal for shifting the bus use right from the DMA transfer circuit to the CPU is outputted to a bus use right decision circuit to suspend DMA transfer. After the bus use right is transferred from the DMA transfer circuit to the CPU, the CPU resumes operation. When an overflow occurs in the DMA transfer timer, a request signal for shifting the bus use right from the CPU to the DMA transfer circuit is outputted to the bus use right decision circuit to transfer the bus use right from the CPU to the DMA transfer circuit with the same means as the start of DMA transfer and to resume DMA transfer.

3 Claims, 5 Drawing Sheets

(DMA TRANSFER CIRCUIT)

(DMA TRANSFER CIRCUIT)

DATA TRANSFER CONTROL APPARATUS WHEREIN A TIME VALUE IS COMPARED TO A CLOCKED TIMER VALUE WITH A COMPARISON OF THE VALUES CAUSING THE TRANSFER OF BUS USE RIGHT

BACKGROUND OF THE INVENTION

1. Field of the Invention

The present invention relates to a data transfer control system for a data processing system which directly controls data transfer between a memory and peripheral functional circuits without the use of a central processing unit.

2. Description of the Prior Art

FIG. 4 is a block diagram of the configuration of a data processing system which employs a conventional data transfer control system. In the figure, reference numeral 2 represents a central processing unit (CPU) for performing arithmetic and control operations for data processing, 3 a memory for storing data (programs and other data) required for data processing, 4 peripheral functional circuits having special functions for data processing, 1 a DMA transfer circuit as a direct transfer circuit for directly transferring data from a source peripheral functional circuit 4 or memory 3 to a destination memory 3 or peripheral functional circuit 4 through a data bus 8 by acquiring the right to use the data bus 8 and bypassing the CPU 2, and 9 an address bus for specifying an address of such a device as the memory 3. The above-mentioned DMA transfer circuit 1 comprises a DMA transfer request accept circuit 5, a DMA transfer data buffer 6 and a DMA transfer control circuit 7. In FIG. 4, reference letter A represents the data input/output line of the CPU 2, B the address output line of the CPU 2, C the data input/output line of the DMA transfer circuit 1, D the address output line of the DMA transfer circuit 1, E the data input/output line of the memory 3, and F the address input line of the memory 3. Letter G represents a DMA request signal line from the peripheral functional circuits 4, H a DMA transfer trigger signal line from the DMA transfer request accept circuit 5 to the DMA transfer control circuit 7, I a CPU stop request signal line from the DMA transfer control circuit 7 to the CPU 2, J a CPU stop complete signal line from the CPU 2 to the DMA transfer control circuit 7, K a DMA transfer complete signal line from the DMA transfer control circuit 7 to the CPU 2, and L a data transfer control line from the DMA transfer control circuit 7 to the DMA transfer data buffer 6.

FIG. 5 is a block diagram of the configuration of a conventional DMA transfer circuit. In the figure, components corresponding to those shown in FIG. 4 are denoted at like reference symbols, and their description will be omitted. In the figure, reference numeral 10 represents a bus use right decision circuit, 11 a bus access control circuit, 12 a transfer pointer, 13 a transfer counter, 14 a source address pointer, and 15 a destination address pointer. Reference letter D' represents the address output line of the source address pointer 14, D" the address output line of the destination address pointer 15, M a DMA transfer start signal line, N a DMA transfer complete signal line to the bus use right decision circuit 10, O a read trigger signal line to the DMA transfer data buffer 6, O' a write trigger signal line to the DMA transfer data buffer 6, P a count signal line to the transfer counter 13, Q a transfer data complete signal line from the transfer counter 13, R a count value of the transfer pointer 12, S a source address output request signal line, and T a destination address output request signal line.

The operation of the data processing system will be described hereafter with reference to FIG. 4. When a DMA transfer request signal is inputted from the peripheral functional circuits 4 to the DMA transfer request accept circuit 5 through the signal line G, the DMA transfer request accept circuit 5 outputs a DMA trigger signal to the DMA transfer control circuit 7 through the signal line H. The DMA transfer control circuit 7 which has accepted the DMA trigger signal outputs a CPU stop request signal to the CPU 2 through the signal line I to stop the operation of the CPU 2. The CPU 2 which has accepted the CPU stop request signal stops operation and outputs a CPU stop complete signal to the DMA transfer control circuit 7 through the signal line J. Through these operations, the data bus use right is transferred from the CPU 2 to the DMA transfer circuit 1.

The DMA transfer circuit 1 which has acquired the data bus use right outputs a source address to the address bus 9 through the signal line D for input into the memory 3 through the signal line F. The memory 3 which has received the source address outputs transfer data from the source address thereof to the data bus 8 through the signal line E. The transfer data outputted to the data bus 8 is inputted into the DMA transfer data buffer 6 through the signal line C. After the transfer data is inputted into the DMA transfer data buffer 6, a destination address is outputted to the address bus through the signal line D, and the transfer data is written through the signal line C, the data bus 8 and the signal line E to the destination address of the memory 3 which has received the destination address through the signal line F. These operations are repeated until data transfer is completed.

When DMA transfer is completed, the data bus use right is transferred from the DMA transfer circuit 1 to the CPU 2, and the DMA transfer control circuit 7 outputs a DMA transfer complete signal to the CPU 2 through the signal line K, whereby the CPU resumes operation.

Next, the operation of the DMA transfer control circuit 7 will be described in conjunction with FIG. 4 and FIG. 5. When the CPU stop signal is inputted into the bus use right decision circuit 10 through the signal line J, the bus use right decision circuit 10 transfers the bus use right from the CPU 2 to the DMA transfer circuit 1, and outputs a DMA transfer start signal to the bus access control circuit 11 through the signal line M. The bus access control circuit 11 which has received the DMA transfer start signal outputs a source address output request signal to the source address pointer 14 through the signal line S. The source address pointer 14 which has received the source address output request signal outputs a source address to the address bus 9 through the signal line D'. At the same time, the bus access control circuit 11 outputs a read trigger signal to the DMA transfer data buffer 6 through the signal line O so as to read out the transfer data outputted from the source address to the DMA transfer data buffer 6 from the data bus 8 through the signal line C.

When the reading of the transfer data from the source address is completed, the bus access control circuit 11 outputs a destination address output request signal to the destination address pointer 15 through the signal line T. The destination address pointer 15 which has received the destination address output request signal outputs a destination address to the address bus 9 through the signal line D". At the same time, the bus access control circuit 11 outputs a write trigger signal to the DMA transfer data buffer 6 through the output line O' so as to write the transfer data at the destination address.

When the transfer of one-byte data is completed with the above-mentioned operation, the bus access control circuit 11 outputs a count signal to the transfer counter 13 through the signal line P. The transfer counter 13 counts down the value of the transfer pointer 12 through the signal line R. If the value of the transfer pointer 12 is not "0" after countdown, the bus access control circuit 11 performs the next DMA transfer.

The transfer counter 13 outputs a transfer data complete signal to the bus access control circuit 11 through the signal line Q when the value of the transfer pointer 12 becomes "0". The bus access control circuit 11 which has received the signal completes DMA transfer, and outputs a DMA transfer complete signal to the bus use right decision circuit 10 through the signal line N. The bus use right decision circuit 10 transfers the bus use right from the DMA transfer circuit 1 to the CPU 2, and thereafter outputs a DMA transfer complete signal to the CPU 2 through the output line K, whereby the CPU 2 resumes operation.

As described above, according to the conventional data transfer control system, the bus use right is transferred from the CPU to the DMA transfer circuit for DMA transfer after the suspension of the CPU, and the bus use right is transferred from the DMA transfer circuit to the CPU for the resumption of the CPU after the completion of DMA transfer.

Since the conventional data transfer control system is such as described above, the priority order of the bus use right (the DMA transfer circuit has priority over the CPU) is fixed irrespective of the operation state of the CPU or the number of data pieces to be transferred. Therefore, during DMA transfer, the CPU cannot be used for processing, which causes the problem of total processing efficiency of the data processing system being lowered.

SUMMARY OF THE INVENTION

The present invention has been worked out to solve the above problem, and it is therefore an object of the invention to provide a data transfer control system which can shift the priority order of the bus use right between the CPU and the direct transfer circuit (DMA transfer circuit) according to the operation condition of the CPU or the number of data pieces to be transferred so as to improve total processing efficiency of the data processing system.

Therefore, in the data transfer control system of the present invention, the bus use right of the data transfer cycle of the direct transfer circuit (DMA transfer circuit 1) and the bus use right of the instruction execution cycle of the CPU 2 are switched at predetermined intervals according to the result of comparison between a count value of a system clock and a value set by an external terminal or software for the control of data transfer.

In the data transfer control system of the present invention, the number of data pieces to be transferred by the direct transfer circuit (DMA transfer circuit 1) is compared with a value set by an external terminal or software, and when the number of data pieces to be transferred is larger or smaller than the value, the bus use right of the data transfer cycle of the direct transfer circuit is forcedly acquired so that data transfer by the direct transfer circuit is performed prior to the CPU 2.

In other words, according to the present invention, a count value and a set value are compared, and each time they agree, the bus use right of the data transfer cycle of the direct transfer circuit (DMA transfer circuit 1) and the bus use right of the instruction execution cycle of the CPU 2 are switched.

According to the present invention, the number of data pieces to be transferred by the direct transfer circuit (DMA transfer circuit 1) and a set value are compared, and when the number of data pieces is larger or smaller than the value, the bus use right of the data transfer cycle of the direct transfer circuit (DMA transfer circuit 1) is forcedly acquired so that data transfer by the direct transfer circuit is performed prior to the CPU 2.

The above and other objects, features and advantages of the invention will become more apparent from the following description when taken in conjunction with the accompanying drawings.

DESCRIPTION OF THE PREFERRED EMBODIMENT

Figure 1:
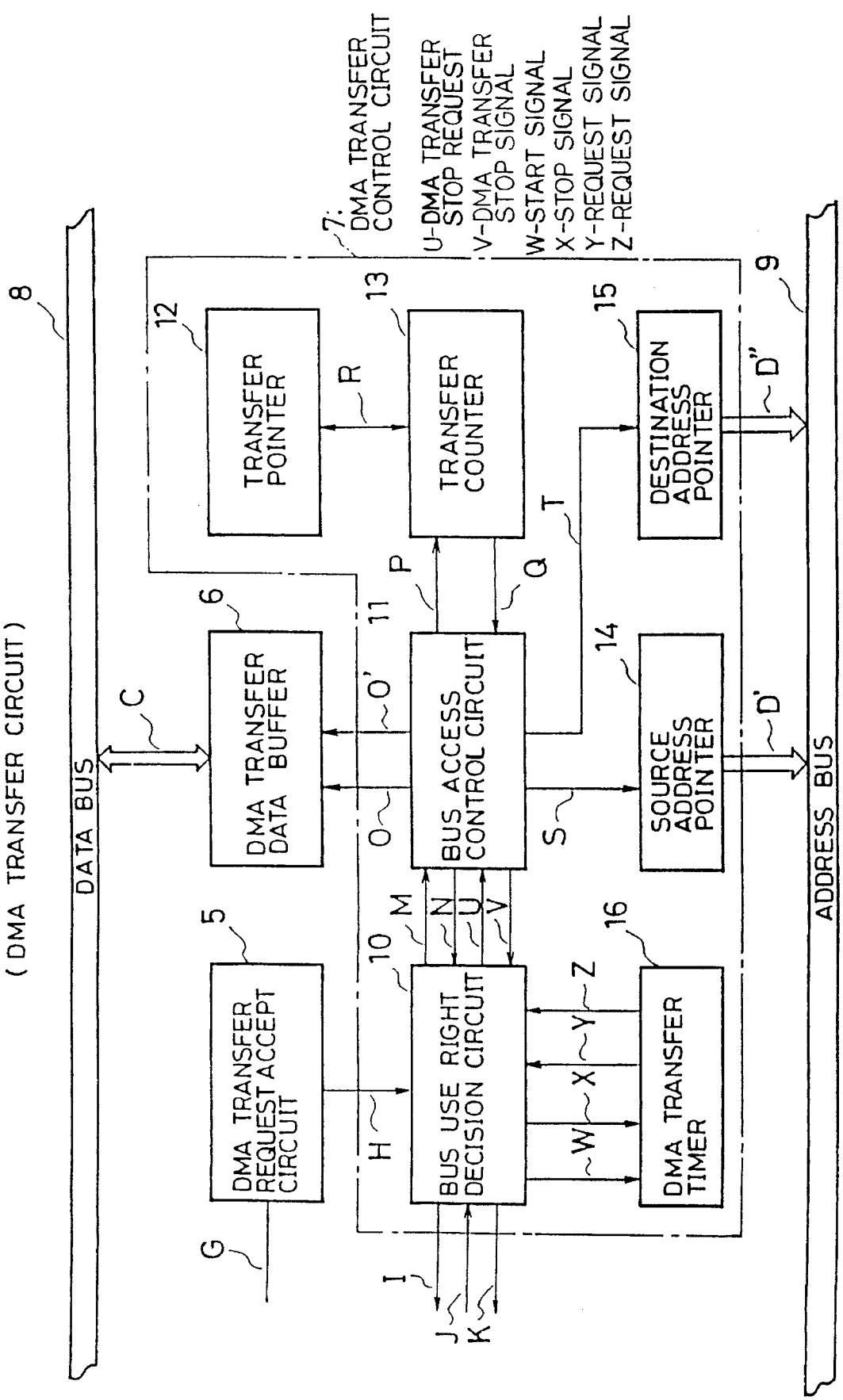
FIG. 1 is a block diagram of the configuration of a DMA transfer circuit according to an embodiment of the present invention.
Figure 4:
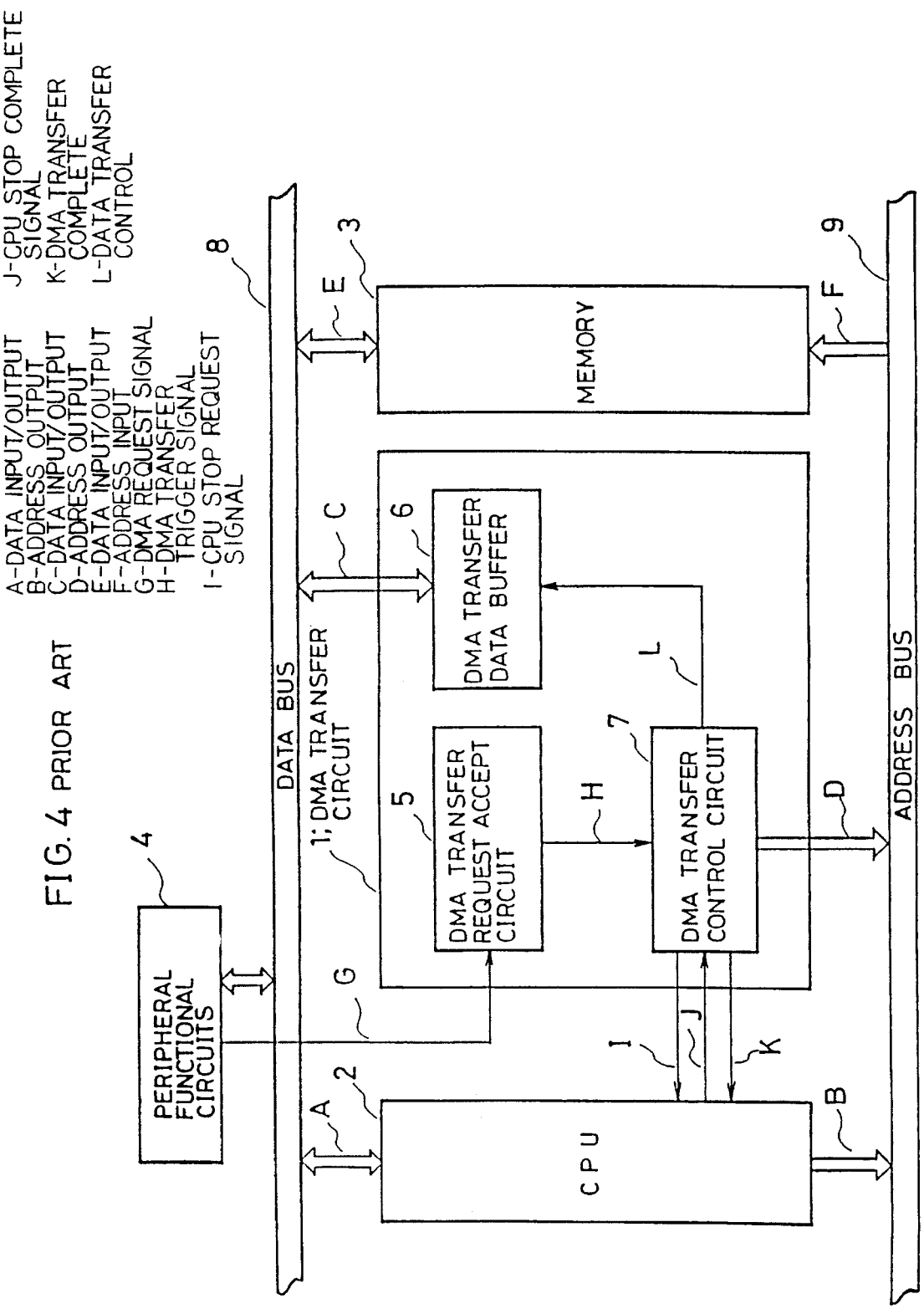
FIG. 4 is a block diagram of the configuration of a data processing system.
Figure 5:
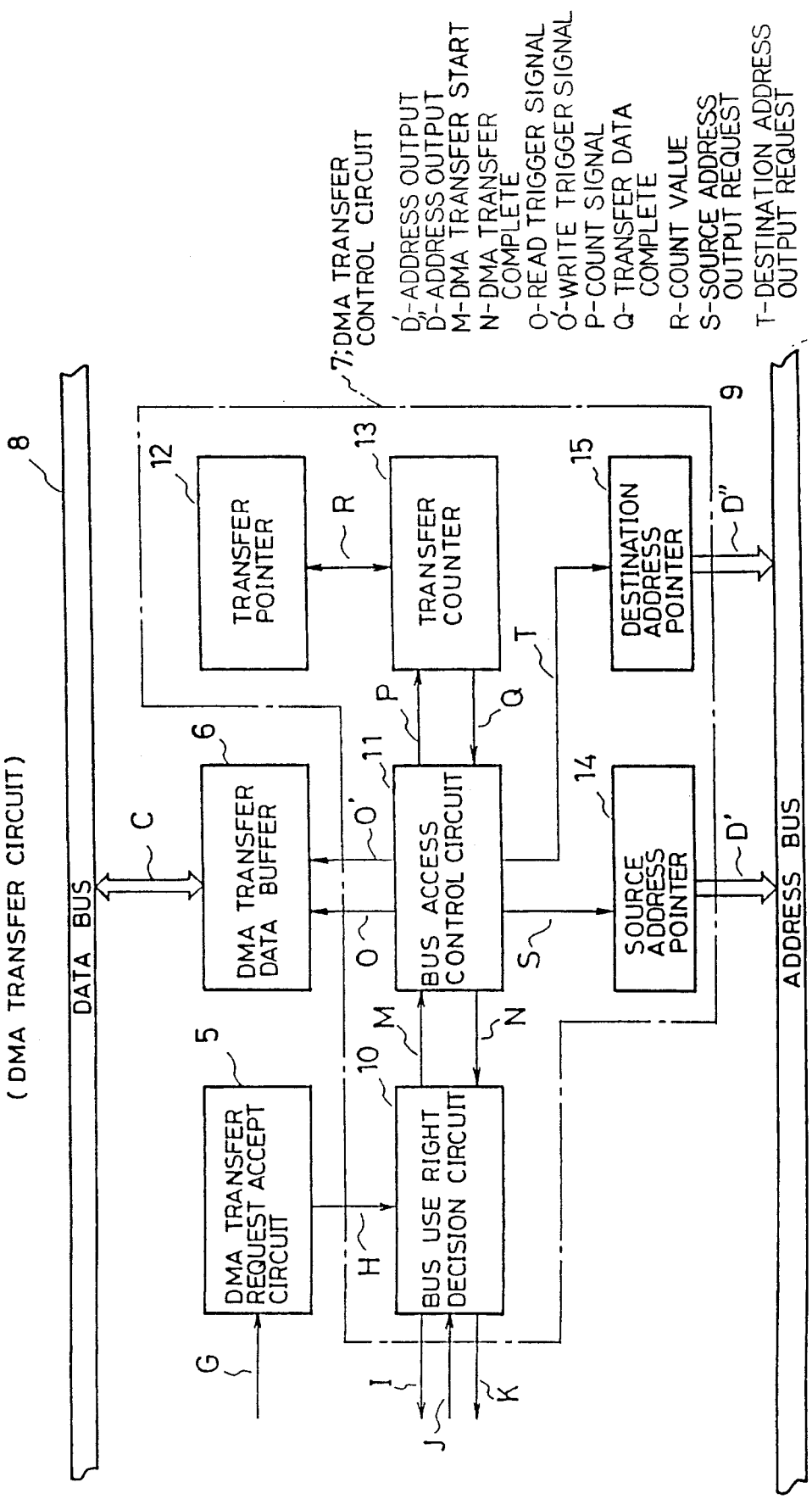
FIG. 5 is a block diagram of the configuration of a DMA transfer circuit of the prior art.

FIG. 1 is a block diagram of the configuration of a DMA transfer circuit according to an embodiment of the present invention claimed in claim 1. In the figure, the same components as those shown in FIG. 5 are denoted at like reference symbols, and their description is omitted. The configuration of a data processing system comprising a DMA transfer control circuit is shown in FIG. 4. In FIG. 1, reference numeral 16 represents a DMA transfer timer (direct transfer timer) newly provided in the DMA transfer control circuit 7 (direct transfer control circuit). Reference letter U represents a DMA transfer stop request signal line, V a DMA transfer stop signal line, W a start signal line for the DMA transfer timer 16, X a stop signal line for the DMA transfer timer 16, Y a request signal line for shifting the bus use right from the DMA transfer circuit 1 to the CPU 2 (refer to FIG. 1), and Z a request signal line for shifting the bus use right from the CPU 2 to the DMA transfer circuit 1.

Figure 2:
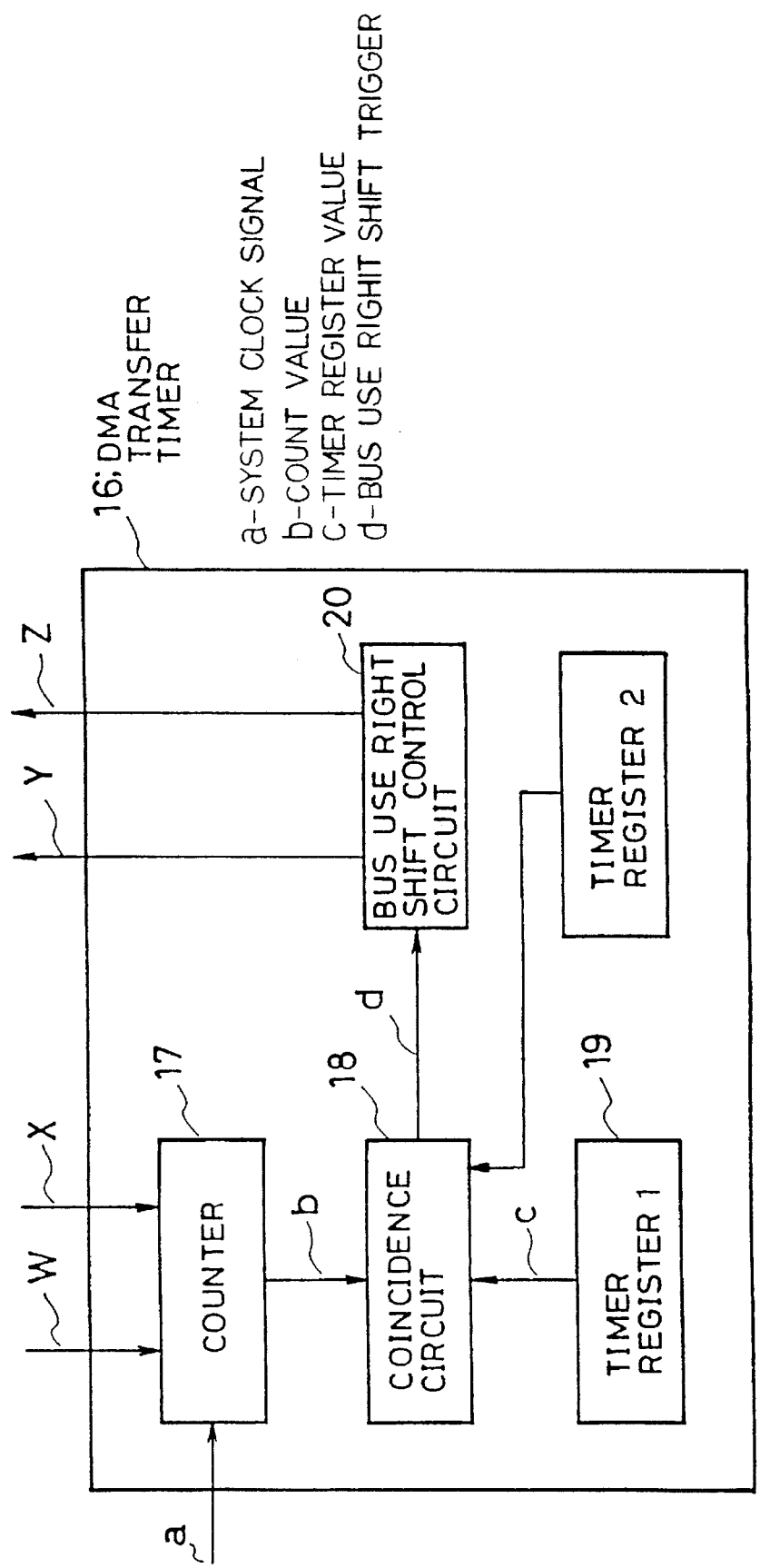
FIG. 2 is a block diagram of the configuration of a DMA transfer timer according to the embodiment claimed in claim 1.

FIG. 2 is a block diagram of the configuration of the DMA transfer timer 16. In the figure, reference numeral 17 represents a counter for counting a system clock, 18 a coincidence circuit, 19 a timer register for storing a value set by an external terminal or software, and 20 a bus use right shift control circuit. Reference letter "a" represents a system clock signal line, "b" a count value of the counter 17, "c" a timer register value, and "d" a bus use right shift trigger signal line. The details of the above-mentioned components will be described later.

With reference to FIG. 1 and FIG. 4, the operation of the DMA transfer circuit according to the embodiment of the present invention claimed in claim 1 will be described in the following. When a CPU stop signal is inputted into the bus use right decision circuit 10 through the signal line J, the bus use right decision circuit 10 shifts the bus use right from the CPU 2 to the DMA transfer circuit 1, and outputs a DMA transfer start signal to the bus access control circuit 11 through the signal line M and a start signal to the DMA transfer timer 16 through the signal line W at the same time.

The operation of the DMA transfer timer will be described in conjunction with FIG. 2 and FIG. 4. When a start signal is inputted into the counter 17, the counter 17 counts up the system clock inputted through the signal line "a". A count value "b" of the system clock and a register value "c" of the timer register 19 are inputted into the coincidence circuit 18. When the count value and the register value agree, a bus use right shift trigger signal (coincidence signal) is outputted to the bus use right shift control circuit 20 through the signal line "d", and at the same time, the value of the counter 17 is initialized to resume count-up. Since the DMA transfer circuit 1 holds the bus use right at this time, the bus use right shift control circuit 20 outputs to the bus use right decision circuit 10 a request signal for shifting the bus use right from the DMA transfer circuit 1 to the CPU 2 through the signal line Y.

The bus use right decision circuit 10 which has received the request signal for shifting the bus use right from the DMA transfer circuit 1 to the CPU 2 outputs a DMA transfer stop request signal to the bus access control circuit 11 through the signal line U. The bus access control circuit 11 performs DMA transfer with the same means as the prior art, but checks whether a DMA transfer stop request signal is inputted or not, every time it transfers one-byte data except that it completes DMA transfer in response to a transfer data complete signal inputted through the signal line Q. When the signal is not inputted, the bus access control circuit 11 transfers the next data. When the signal is inputted, the bus access control circuit 11 temporarily stops DMA transfer, and outputs a DMA transfer stop signal to the bus use right decision circuit 10 through the signal line V. The bus use right decision circuit 10 shifts the bus use right from the DMA transfer circuit 1 to the CPU 2 when both of the request signal for shifting the bus use right from the DMA transfer circuit 1 to the CPU 2 and the DMA transfer stop signal are inputted, and thereafter outputs a DMA transfer complete signal to the CPU 2 through the signal line K, whereby the CPU resumes operation.

Since DMA transfer is stopped, and the operation of the DMA transfer timer 16 is not stopped, a bus use right shift trigger signal is outputted through the signal line "d" when the count value and the register value agree next time. Since the CPU 2 holds the bus use right at this time, the bus use right shift control circuit 20 outputs to the bus use right decision circuit 10 a request signal for shifting the bus use right from the CPU 2 to the DMA transfer circuit 1 through the signal line Z. The bus use right decision circuit 10 which has received the request signal for shifting the bus use right from the CPU 2 to the DMA transfer circuit 1 shifts the bus use right from the CPU 2 to the DMA transfer circuit 1 with the same means as the start of DMA transfer, and outputs a DMA transfer start signal to the bus access control circuit 11 through the signal line M. The bus access control circuit 11 which has received the DMA transfer start signal resumes transfer from where DMA transfer was stopped by the DMA transfer stop request signal.

The above operation is repeated until the completion of data transfer to shift the bus use right between the CPU 2 and the DMA transfer circuit 1. To complete DMA transfer with the completion of data transfer, the bus use right decision circuit 10 outputs a stop signal to the DMA transfer timer 16 through the signal line X so as to stop the operation of the DMA transfer timer 16, in addition to the operation of an ordinary DMA transfer circuit.

As described above, according to this embodiment of the present invention, a CPU instruction execution cycle and a DMA transfer cycle can be shifted at predetermined intervals by a register value set by an external terminal or software.

In this embodiment, the register for setting a CPU cycle time is also used as a register for setting a DMA transfer cycle time, but a register for setting a CPU cycle time and a register for setting a DMA transfer cycle time may be separately provided to freely set both of the cycle times, as shown by TIMER REGISTER 2.

Figure 3:
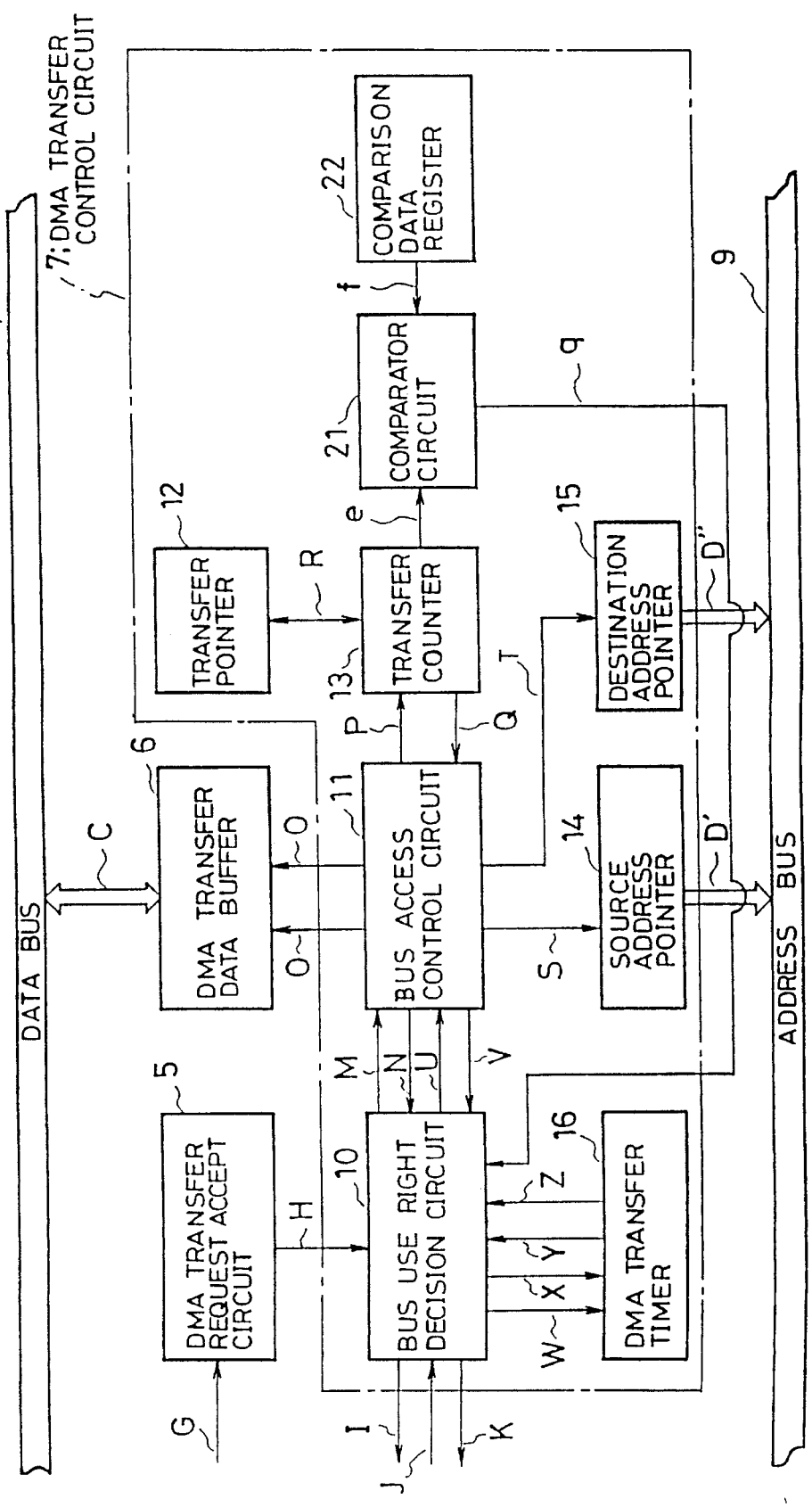
FIG. 3 is a block diagram of the configuration of a DMA transfer circuit according to another embodiment of the present invention claimed in claim 2.

FIG. 3 is a block diagram of the configuration of a DMA transfer circuit according to another embodiment of the present invention claimed in claim 2. In the figure, the same components as those shown in FIG. 1 are denoted at like symbols, and their description is omitted. In the figure, reference numeral 21 represents a comparator circuit, and 22 a comparison data register. Reference letter "e" represents a count value (number of data pieces to be transferred) of the transfer counter 13, "f" a value of the comparison data register, and "g" a DMA transfer priority signal line.

Next, the operation of the DMA transfer circuit according to the embodiment of the present invention claimed in claim 2 will be described with reference to FIG. 3. The same components as those shown in FIG. 1 perform the same operations as the previous embodiment except for new circuits and signal lines added to FIG. 3. The comparator circuit 21 compares a count value "e" of the transfer counter 13 and a value "f" of the comparison data register 22 (comparison data value) set by an external terminal or software. When the count value (number of remaining data pieces to be transferred) of the transfer counter 13 is smaller than the value of the comparison data register 22, the comparator circuit 21 outputs a DMA transfer priority signal to the bus use right decision circuit 10 through the signal line "g". The bus use right decision circuit 10 which has received the DMA transfer priority signal provides the bus use right to the DMA transfer circuit 1 despite a request signal for shifting the bus use right from the DMA transfer circuit 1 to the CPU 2 inputted from the DMA transfer timer 16 through the signal line Z.

According to the above-mentioned operation, when the number of DMA transfer data pieces is smaller than the number of data pieces indicated by the comparison data register 22 and set by the external terminal or software, DMA transfer is performed first to complete transfer.

This embodiment illustrates the case where DMA transfer is performed first when the number of DMA transfer data pieces is smaller than a predetermined number. However, it is possible to obtain a circuit having the same configuration as the embodiment which provides priority to DMA transfer by slightly changing the function of the comparator circuit 21 (which outputs a DMA transfer priority signal when a count value of the transfer counter 13 is larger than a set value of the comparison data register 22) when the number of DMA transfer data pieces is larger than the number of data pieces indicated by the comparison data register 22 and set by the external terminal or software.

As described in the foregoing, according to the embodiment of the present invention, a DMA transfer cycle takes priority over a CPU instruction execution cycle according to the number of DMA transfer data pieces.

As described above, according to the invention claimed in claim 1, the bus use right of the data transfer cycle of the direct transfer circuit and the bus use right of the instruction execution cycle of the CPU are shifted at predetermined intervals according to the result of comparison between a count value of a system clock and a value set by the external terminal or software for the control of data transfer. Therefore, the priority order of the direct transfer circuit and the CPU for the bus use right can be changed, thus making it possible to improve the total processing efficiency of the data processing system.

According to the invention claimed in claim 2, the number of data pieces to be transferred by the direct transfer circuit and a value set by the external terminal or software are compared, and when the number of data pieces to be transferred is larger or smaller than the set value, the bus use right of the data transfer cycle of the direct transfer circuit is forcedly acquired so that data transfer by the direct transfer circuit is performed prior to the CPU, whereby it is easily possible to give priority to direct data transfer when the number of remaining data pieces to be directly transferred is small or to perform direct transfer first until the number of data pieces to be directly transferred falls below a predetermined number. As a result, the total processing efficiency of the data processing system can be improved.

What is claimed is:

1. A data transfer control system comprising:

a data bus;

a central processing unit coupled to the data bus;

a memory coupled to the data bus;

a plurality of peripheral functional circuits;

a DMA transfer circuit, coupled to the data bus, for transferring data between said plurality of peripheral functional circuits and said memory upon acquiring a right to use the data bus from said central processing unit in response to a DMA transfer request signal from said plurality of peripheral function circuits; and decision means for alternately selecting which of said central processing unit or said DMA transfer circuit is to be granted a bus use right and for granting, after the receipt of said DMA transfer request and during a DMA transfer cycle, said bus use right to a selected one of said central processing unit or DMA transfer circuit in every cycle time counted by means of a system clock.

2. A data transfer control system comprising:

a data bus;

a central processing unit coupled to the data bus;

a memory coupled to the data bus;

a plurality of peripheral functional circuits;

a DMA transfer circuit, coupled to the data bus, for transferring data between said plurality of peripheral functional circuits and said memory upon acquiring a right to use the data bus from said central processing unit in response to a DMA transfer request signal from said plurality of peripheral function circuits; and decision means for alternately selecting which of said central processing unit or said DMA transfer circuit is to be granted a bus use right and for granting, after the receipt of said DMA transfer request and during a DMA transfer cycle, said bus use right to a selected one of said central processing unit or DMA transfer circuit in every cycle time counted by means of a system clock;

wherein said decision means comprises:

a counter for counting said cycle time by means of said system clock, a timer register for setting an instruction execution time for said central processing unit or a DMA transfer cycle time for said DMA transfer circuit, a setting value for said time being supplied by an external terminal or software, a coincidence decision circuit receiving a count value counted by said counter and the value set in said timer register and outputting a coincidence signal at the time when said count value coincides with said set value, a bus use right change control circuit receiving said coincidence signal and outputting a request signal for changing said bus use right, and a bus use right decision circuit for forcing said DMA transfer circuit to acquire said bus use right by stopping the operation of said central processing unit or forcing said central processing unit to acquire said bus use right by stopping the operation of said DMA transfer circuit in response to said request signal for changing bus use right.

3. A data transfer control system including a data bus;

a central processing unit coupled to the data bus;

a memory coupled to the data bus;

a plurality of peripheral functional circuits;

a DMA transfer circuit, coupled to the data bus, for transferring data between said plurality of peripheral functional circuits and said memory upon acquiring a right to use the data bus from said central processing unit in response to a DMA transfer request signal from said plurality of peripheral function circuits; and decision means for alternately selecting which of said central processing unit or said DMA transfer circuit is to be granted a bus use right and for granting, after the receipt of said DMA transfer request and during a DMA transfer cycle, said bus use right to a selected one of said central processing unit or DMA transfer circuit in every cycle time counted by means of a system clock;

wherein said decision means comprises:

a counter for counting cycle time by means of said system clock, a first timer register for setting an execution cycle time for said central processing unit, a setting value for said time being supplied by an external terminal or software, a second timer register for setting a DMA transfer cycle time for said DMA transfer circuit, a setting value for said time being supplied by an external terminal or software, a coincidence decision circuit receiving the count value by said counter and the value set in said first timer register or in said second timer register and outputting a coincidence signal at the time when said count value coincides with said set value, a bus use right change control circuit receiving said coincidence signal and outputting a request signal for changing said bus use right, a bus use right decision circuit for forcing said DMA transfer circuit to acquire said bus use right by stopping the operation of said central processing unit or forcing said central processing unit to acquire said bus use right by stopping the operation of said DMA transfer circuit in response to said request signal for changing said bus use right.

* * * * *